United States Patent
Pereira et al.

(10) Patent No.: US 9,006,995 B2
(45) Date of Patent: Apr. 14, 2015

(54) CONTROLLABLE RETROFIT LED LAMPS AND LIGHTING SYSTEM HAVING AN LED LAMP

(75) Inventors: Eduardo Pereira, Siebnen (CH); Michael Zimmermann, Heiligkreuz (CH)

(73) Assignee: Tridonic AG, Ennenda (CH)

( * ) Notice: Subject to any disclaimer, the term of this patent is extended or adjusted under 35 U.S.C. 154(b) by 259 days.

(21) Appl. No.: 13/514,169

(22) PCT Filed: Dec. 8, 2010

(86) PCT No.: PCT/EP2010/069156
§ 371 (c)(1), (2), (4) Date: Jul. 16, 2012

(87) PCT Pub. No.: WO2011/070058
PCT Pub. Date: Jun. 16, 2011

(65) Prior Publication Data
US 2012/0280638 A1   Nov. 8, 2012

(30) Foreign Application Priority Data

Dec. 8, 2009  (DE) .......................... 10 2009 047 654

(51) Int. Cl.
| H05B 37/02 | (2006.01) |
| H05B 33/08 | (2006.01) |
| H05B 39/04 | (2006.01) |
| F21V 3/00  | (2006.01) |

(Continued)

(52) U.S. Cl.
CPC .......... *H05B 33/0842* (2013.01); *H05B 39/044* (2013.01); *Y02B 20/383* (2013.01); *F21V 3/00* (2013.01); *F21K 9/135* (2013.01); *H05B 37/0263* (2013.01); *F21Y 2101/02* (2013.01)

(58) Field of Classification Search
USPC ......... 315/246, 247, 287, 291, 294, 297, 316, 315/324, 362
See application file for complete search history.

(56) References Cited

U.S. PATENT DOCUMENTS

| 5,990,635 | A  | * | 11/1999 | Ference et al. ................ 315/362 |
| 6,211,627 | B1 |   | 4/2001  | Callahan |
| 7,906,916 | B2 | * | 3/2011  | Gehman ....................... 315/291 |

(Continued)

FOREIGN PATENT DOCUMENTS

| DE | 10230103 A1   | 1/2004 |
| WO | 2004006629 A2 | 1/2004 |

OTHER PUBLICATIONS

International Search Report issued in connection with the corresponding International Application No. PCT/EP2010/069156 on Dec. 16, 2011.

(Continued)

*Primary Examiner* — Tung X Le
(74) *Attorney, Agent, or Firm* — The H.T. Than Law Group

(57) ABSTRACT

The invention relates to a retrofit LED lamp (17) comprising a carrier (18) having at least one light-emitting diode (LED) (29), further comprising a driver circuit (12) for supplying power to the LED (29) and a socket (20) for electrically and mechanically connecting to a conventional lamp holder, characterized in that the retrofit LED lamp (17) comprises a carrier frequency system or power line communication (PLC) unit (16) connected to the electrical contacts (3, 4) and designed for receiving and/or transmitting data via the socket (20).

6 Claims, 3 Drawing Sheets

(51) Int. Cl.
　　　*F21K 99/00*　　(2010.01)
　　　*F21Y 101/02*　　(2006.01)

(56) References Cited

U.S. PATENT DOCUMENTS

| | | |
|---|---|---|
| 2004/0066142 A1 | 4/2004 | Stimac et al. |
| 2004/0105264 A1 | 6/2004 | Spero |
| 2008/0211427 A1* | 9/2008 | Budde et al. .................. 315/294 |
| 2009/0160627 A1 | 6/2009 | Godbole |
| 2009/0237011 A1* | 9/2009 | Shah et al. .................... 315/312 |
| 2010/0019889 A1 | 1/2010 | Braunshtein |
| 2010/0176733 A1* | 7/2010 | King ............................. 315/158 |
| 2010/0283391 A1* | 11/2010 | Braunshtein ................. 315/127 |

OTHER PUBLICATIONS

Notification of Transmittal of Translation of the International Preliminary Report on Patentability.

* cited by examiner

CONTROLLABLE RETROFIT LED LAMPS AND LIGHTING SYSTEM HAVING AN LED LAMP

BACKGROUND OF THE INVENTION

The present invention relates generally to lamp operating devices and respectively systems and methods by means of which luminous means such as, for example, light emitting diodes or luminescence diodes (LEDs) can be operated. However, the invention relates in particular to retrofit LED lamps, that is to say LED lamps which, with regard to their mechanical and electrical connections, are configured as a replacement for incandescent lamps or halogen lamps.

"LED" should also be understood to include "OLED" throughout.

In order to realize larger and convenient lighting systems it is already known that lamp operating devices can be driven by the communication of external control commands. This external predefinition makes it possible, for example, to control the brightness of a light source operated by the lamp operating device.

The published patent application DE 102 30 103 A1 discloses an LED light module, for example, which has an arrangement of a number of series-connected LEDs, said arrangement being fed with AC current. Said LEDs are applied as so-called LED dice on a printed circuit board using a chip-on-board (COB) technology. The thermally conductive, ceramic printed circuit board of the LED lighting module is directly supplied with power by the power supply system. Furthermore, the LEDs of said module are dimmable, wherein driving via a microcontroller connected to a bus is proposed for dimming the brightness of the photon radiation emitted by said LEDs.

On account of their power-saving properties, in particular, LEDs are increasingly being used in luminous means or so-called retrofit LED lamp which can replace the traditional incandescent filament bulbs. In order that such luminous means can replace incandescent lamps in the first place, it is necessary that the design of the luminous means substantially still remains as in traditional incandescent filament bulbs, and accordingly still has a standardized base. Such a base relates, for example, to a so-called Edison base with standardized thread identifier E27, E40 or the like. The conventional lampholder is a standardized lampholder. The E14, E11 or E27 screw threads may be mentioned as further examples. Alternatively, a lampholder designed for a low-voltage connection is also conceivable, such as a G4, G5 or G6 holder. A BA9 or BA15 bayonet holder is also conceivable.

The same applies to LED lamps configured as a replacement for halogen luminous means.

With the use of LEDs in luminous means with an incandescent lamp base, however, the possibility of external driving via a bus, as disclosed in the published patent application DE 102 30 103 A1, is no longer afforded. In actual fact, an incandescent lamp base only has two electrical contacts. These are firstly the external contact of the lampholder and furthermore the base contact of the base for producing the electrical contact.

FIG. 1 shows a circuit arrangement with an AC voltage 7 or power supply system voltage made available between two contacts 5, 6. A first series line leads from the first contact 5 to a switch or dimmer 1 and furthermore to a first electrical contact 3 of a holder 2 for an incandescent lamp and furthermore to a first electrical contact 23 of an incandescent lamp 8. The incandescent lamp 8 has a standardized base, an incandescent element, the first electrical contact 23 to the holder 2 for the incandescent lamp and a second electrical contact 24, which is led via the holder 2 to the second contact 6 of the AC voltage 7. The ensemble of holder 2 for the incandescent lamp and incandescent lamp 8 is designated by the reference sign 10.

FIG. 2 shows a luminous means in the form of a retrofit LED lamp 9 having the standardized incandescent lamp base and LEDs instead of an incandescent filament. The retrofit LED lamp 9 mounted in the holder 2 is designated by the reference sign 11. As can be discerned, a control unit of the luminous means 11 cannot receive data or commands via an additional bus, since the base or the holder does not afford a corresponding connection possibility.

SUMMARY OF THE INVENTION

There is now a need to provide an improved retrofit LED lamp which, in particular, is controllable in a simple manner.

This object is achieved according to the invention by means of the features of the independent claims. The dependent claims develop the central concept of the invention in a particularly advantageous manner.

The invention therefore proposes a retrofit LED lamp, more particularly LED "incandescent bulb", comprising a carrier having at least one light emitting diode (LED), furthermore comprising a driver circuit for supplying power to the at least one LED and a base for electrical and mechanical connection to a conventional lampholder. The retrofit LED lamp comprises a carrier frequency system or powerline communication (PLC) unit designed for receiving and/or transmitting PLC-modulated data via the base.

The conventional lampholder is a standardized lampholder. Examples include an E14, E17 or E27 screw thread. Alternatively, a lampholder designed for a low-voltage connection is also conceivable such as a G4, G5 or G6 holder. A BA9 or BA15 bayonet holder is also conceivable.

The PLC unit can be designed for receiving commands with regard to the brightness, the color and/or the color temperature of the LED(s).

The retrofit LED lamp comprises a control unit for regulating the brightness of LED(s) in accordance with the received command.

The retrofit LED lamp comprises an AC-DC converter for connection to a power supply system voltage, and a DC controller connected to the AC-DC converter and serving for delivering a current for operating the LED.

The control unit can control the DC controller in accordance with the received command.

A further aspect of the invention proposes a switch for switching on, switching off and/or dimming a luminous means used in a conventional lampholder. The switch has a carrier frequency or powerline communication (PLC) unit designed for receiving and/or transmitting PLC-modulated data.

A further aspect of the invention proposes an arrangement for switching on, switching off and/or dimming a luminous means used in a conventional lampholder. The arrangement has, in parallel with the switch, a carrier frequency or powerline communication (PLC) unit designed for receiving and/or transmitting PLC-modulated data.

The PLC unit can be designed for transmitting commands with regard to the brightness of the luminous means used in a conventional lampholder.

A further aspect of the invention proposes a lighting system comprising at least one conventional lampholder and at least one switch defined above.

The lighting system can comprise at least one retrofit LED lamp defined above which is used in the conventional lampholder.

A further aspect of the invention proposes a lighting system, comprising a central controller for transmitting commands via a PLC transmitting unit, at least one conventional lampholder and at least one retrofit LED lamp defined above which is used in a conventional lampholder.

BRIEF DESCRIPTION OF THE DRAWINGS

Further features, advantages and properties of the present invention will now be explained in greater detail with reference to the figures of the accompanying drawings and on the basis of the detailed explanation of an exemplary embodiment.

DETAILED DESCRIPTION OF THE INVENTION

Figure 1:
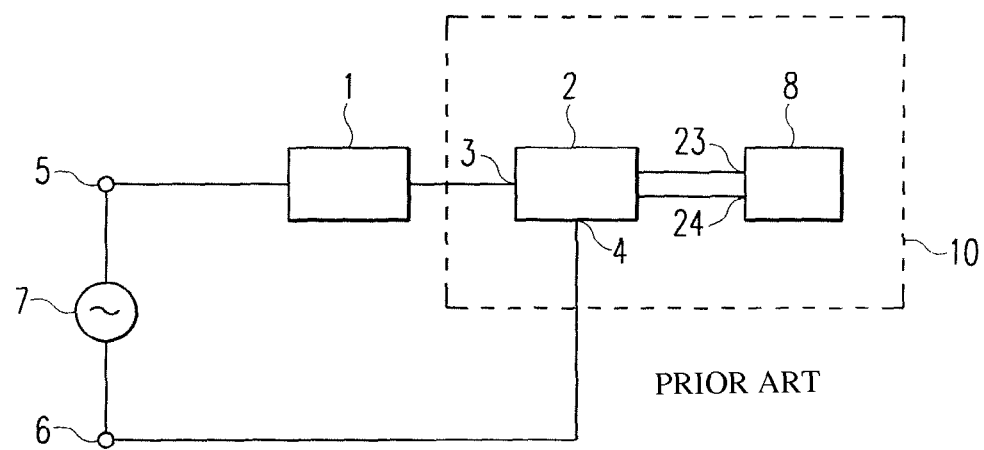
FIG. 1 shows a schematic view of an incandescent lamp connected to an AC voltage.
Figure 2:
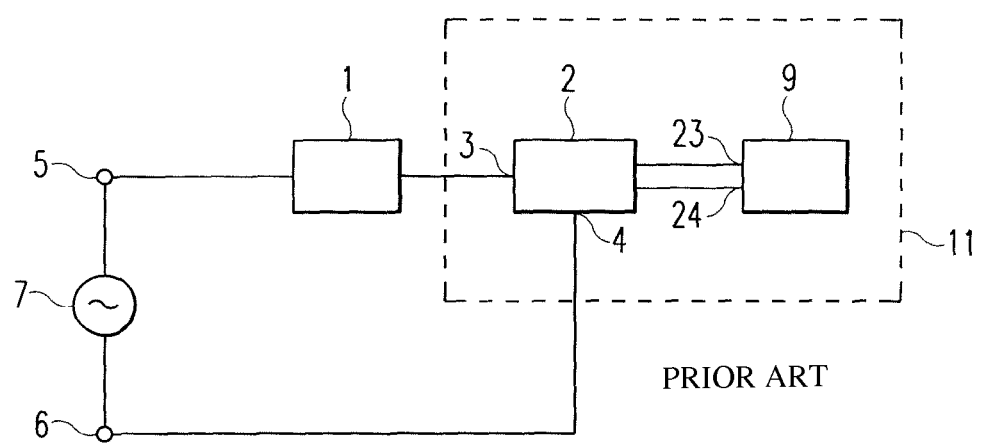
FIG. 2 shows a schematic view of an LED luminous means connected to an AC voltage, FIG. 3 schematically shows a first exemplary embodiment of a retrofit LED lamp for conventional power supply voltage lampholders.
Figure 3:
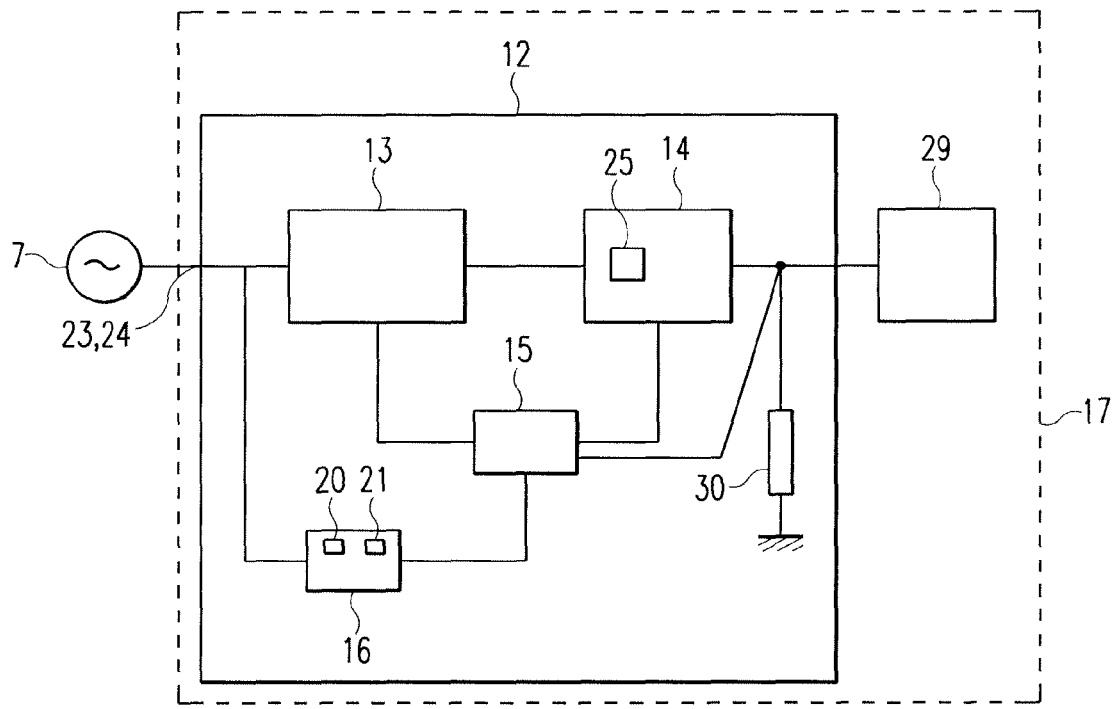
Figure 4:
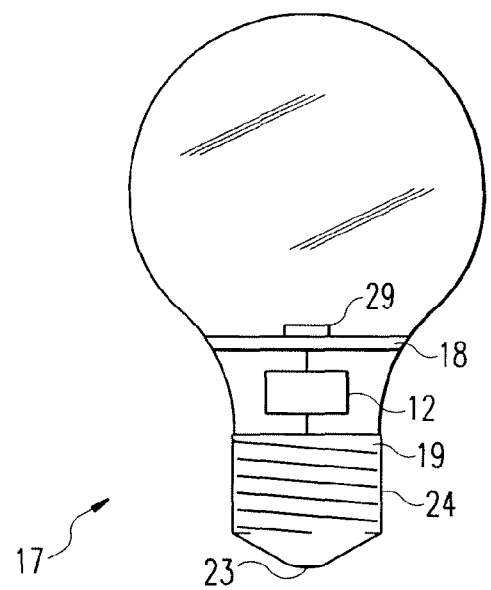
FIG. 4 shows the construction of a retrofit LED lamp according to the invention.

FIG. 3 and FIG. 4 show an embodiment according to the invention of a light emitting diode (LED) lamp having a carrier or LED module 18. This concerns a retrofit LED lamp 17 for use in a conventional lampholder 2. For this purpose, the bulb 17 has a conventional or standardized base 19, for example having an E14, E17 or E27 screw thread. Alternatively, a base designed for a low-voltage connection is also conceivable, such as a G4, G5 or G6 pin base. A BA9 or BA15 bayonet base is also conceivable.

Since the retrofit LED lamp 17 is supplied with power supply system AC voltage 7 or with low voltage by a corresponding lampholder, current matching is required for correct operation of the LED module 18. For this purpose, the LED lamp 17 comprises a driver circuit 12. The latter can comprise any drive circuit conceivable for this use, such as is known from the prior art. Thus, by way of example, an AC-DC converter 13 for rectifying a power supply system AC voltage is conceivable.

Advantageously, downstream of the latter it is possible to connect a DC-DC converter or DC controller 14, which regulates the current (averaged with respect to time), through the LED(s) e.g. by means of PWM or by means of the current amplitude. In this case, it is possible to use a switch (not shown) that is switched by means of pulse width modulation (PWM). A current limiting circuit connected downstream, for example by means of a transistor circuit (now shown), is also conceivable.

The control of the DC-DC converter 14 is performed by a control unit 15 of the driver circuit 12, wherein the control unit 15 can detect parameters of the AC-DC converter 13, of the DC-DC converter 14, or of other components of the driver circuit 12 for control purposes, for example.

The carrier 18 can comprise one or a plurality of LEDs 29 and/or organic light emitting diodes (OLEDs). In this case, in particular dye-converted LEDS e.g. blue LEDs can be used, or RGB-LED modules. The dye-converted LEDs are, in particular, at least one blue LED in which part of the emitted blue light is converted into yellow light by dye conversion means such as phosphorus. Preferably, one or a plurality of monochromatic e.g. red, LEDs are additionally used, which lead e.g. to a higher color rendering value and provide for warmer light. In this case, the red LEDs can be arranged separately from the dye-converted blue LEDs or they can be situated alongside the latter, such that part of their emitted red light is likewise dye-converted.

In this case, the one or the plurality of white LEDs can preferably be driven independently of the at least one monochromatic LED, namely via a PLC bus, as will be explained in greater detail below. Consequently, the brightness, the color, the color rendering (CRI value and/or the color temperature of the overall spectrum resulting from the plurality of LEDs can be predefined in the case of a white LED lamp.

According to the invention, the driver circuit 12 of the retrofit LED lamp 17 now has a carrier frequency or power-line communication (PLC) unit 16. On the one hand, this PLC unit 16 is electrically connected to the supply lines of the retrofit LED lamp 17. Preferably, the PLC unit 16 is connected to the first electrical contact or base contact 23 of the base 19 and/or to the second electrical contact or external contact 24 of the base 19. The possibility of incorporating a switch between the first and/or second electrical contact 23, 24 and the PLC unit 16 is also conceivable. In this way, said PLC unit 16 can be decoupled from the supply system.

The PLC bus driving of the LED lamp can be unidirectional, that is to say that only control data are transmitted to the LED lamp 17, e.g. from a bus control center or from a manual control unit. The subscriber transmitting via PLC can also be a sensor (motion detector, brightness sensor, . . . ,) or a simple operating unit (rotary controller or else touch panel). However, the PLC control unit can thus have a bus interface and thus be connected to a bus for a lighting control.

Alternatively or additionally, an LED lamp 17 can transmit e.g. state (temperature, aging of the data, . . . ) or fault information via the PLC bus. The state or fault information can be acquired, stored and/or output by the controller in the LED lamp automatically and/or in response to an external command.

The aging information can be determined by means of an operating number or operating duration counter in the LED lamp. Alternatively or additionally, the aging of the LED lamp can be implemented on the basis of at least one internal measurement, in particular an internal measurement of an electrical or optical parameter representing the aging.

A demodulator 20 is part of the PLC unit 16, such that a possible data transfer via the power supply network and via the supply contacts of the retrofit LED lamp 17 can be demodulated. It is a demodulator which is known in accordance with the prior art and which, depending on the type of modulation, applies a corresponding demodulation method known to the person skilled in the art. The modulation can be based either on an analog method, such as, for example, in the case of frequency modulation (FM), and on a digital method, such as, for example, in the case of amplitude modulation ASK (Amplitude Shift Keying) or quadrature phase shift keying (QPSK). The demodulator is also preferably adapted to the frequency range in which signals should be expected.

A demultiplexer 21 can additionally be provided in the PLC unit 16. The advantage of this variant is that a plurality of useful signals transmitted in parallel via the power supply network can be received by the retrofit LED lamp 17. Said useful signals are recovered by the multiplexer 21 in accordance with the multiplex technique used—time division multiplex, frequency division multiplex or code division multiplex.

The signal or signals obtained by the PLC unit 16 are fed to the control unit 15, wherein said signals can be, in particular commands for switching on, switching off or dimming the retrofit LED lamp 17. Preferably, the command consists in a desired value of the current through the LEDs 29 of the retrofit LED lamp 17. The control unit 15, which can be embodied as a microcontroller or as an application-specific integrated circuit (ASIC), controls or regulates the brightness generated by the retrofit LED lamp 17 in accordance with said command.

One possibility for brightness control or preferably regulation can consist, for example, in the fact that in the DC controller 14 a switching regulator 25 regulates the current through the retrofit LED lamp 17 in accordance with a control signal fed to said regulator by the control unit 15. As is known, the current through the LEDs 29 of the retrofit LED lamp 17 and thus the brightness are determined by the ratio of the switching on and switching off of the switching regulator 25.

For regulating the brightness, the control unit 15 detects one or a plurality of parameters of the electrical circuit within the retrofit LED lamp 17. By way of example, for this purpose a measuring resistor 30 in the form of an ohmic resistor can be arranged in series with the LEDs 29. For regulating the current through the LEDs 29, the voltage drop across the measuring resistor 30 is then detected and fed as measurement signal to the control unit 15. In the control unit 15, the current through the LEDs 29 detected from said measurement signal is compared with the desired value of the current through the LEDs 29 as received from the PLC unit 16, such that the actual current through the LEDs 29 can be correspondingly regulated.

Figure 5:
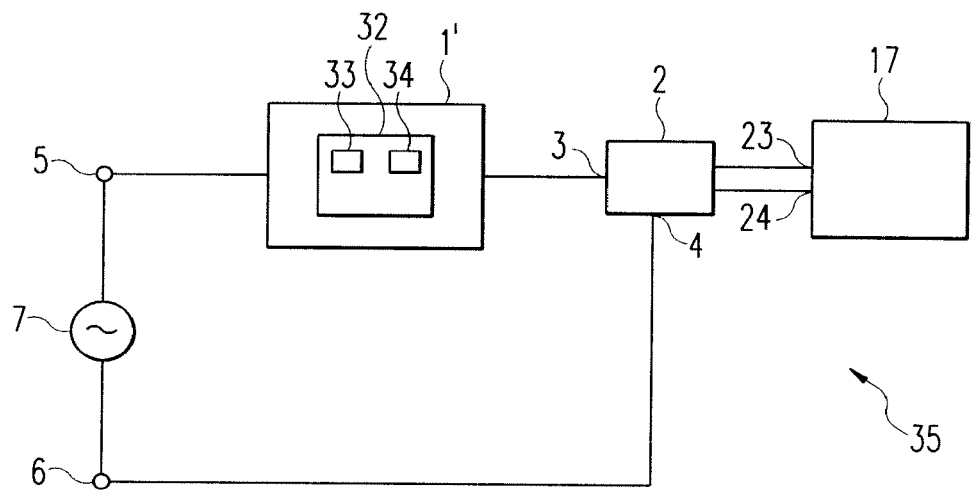
FIG. 5 shows a schematic view of a lighting system according to the invention.

FIG. 5 shows a schematic view of a lighting system 35 according to the invention. The lighting system 35 comprises the retrofit LED lamp 17 shown in FIGS. 3 and FIG. 4. The system 35 furthermore comprises a switch or dimmer 1', for switching on and switching off and dimming the retrofit LED lamp 17, and a conventional or standardized lampholder 2, in which the retrofit LED lamp 17 can be used.

In this embodiment, the switch or dimmer 1' includes a PLC transmitting unit 32 designed for modulating and transferring useful data via the power supply network. For this purpose, a modulator 33 is provided in the PLC transmitting unit 32, wherein the modulator 33 and the demodulator 20 of the retrofit LED lamp 17 are adapted to one another. Thus, the demodulator 20 can process at least the modulation methods and the frequency ranges which are also used by the demodulator 20.

Preferably, the PLC transmitting unit 32 also has a multiplexer 34 for simultaneously transferring a plurality of useful signals via the power supply network. A demultiplexer 21 is then provided in the retrofit LED lamp 17, and can unbundle the signal generated by the multiplexer 34 again in accordance with the multiplex method used. After unbundling by the demultiplexer 21, the demodulator 20 can then demodulate the signal.

In principle, the lighting system 35 can comprise a plurality of pairs of lampholders 2 and LED lamps 17. In this case, one switch or dimmer 1' serves for simultaneously switching on and off and dimming all LED lamps 17. The PLC transmitting unit 32 correspondingly transmits only one command via the power supply network. This command is received by the different PLC units 16 of the different LED lamps 17 and all LEDs of the system 35 are driven with a similar desired brightness value.

As an alternative to this exemplary embodiment, the lighting system 35 can also have a plurality of switches or dimmers 1' which each transmit a command for an individual LED lamp 17 or for a group of LED lamps 17 via a PLC transmitting unit 33.

As an alternative thereto, it is also possible for a plurality of switches or dimmers 1' to drive a single retrofit LED lamp 17 by means of a powerline method. The PLC unit 16 of a retrofit LED lamp 17 of this type is able to receive different useful signals proceeding from different PLC transmitting units 32 and to reproduce them for the control unit 15. In this case, the control unit 15 can employ different priority mechanisms. Thus, it can for example take account of the commands of the different PLC transmitting units 32 successively. In order to prevent brightness changes that are possibly too fast, however, after the receipt of a first command, during a specific time, the commands proceeding from other PLC transmitting units 32 can also be ignored.

The embodiment in FIG. 5 provides for the switch or dimmer 1' according to the invention to replace a conventional switch or dimmer 1 for controlling an incandescent lamp 8. By way of example, it is thereby possible to replace a switch or dimmer 1 which can dim an incandescent lamp 8 on the basis of phase gating control.

Figure 6:
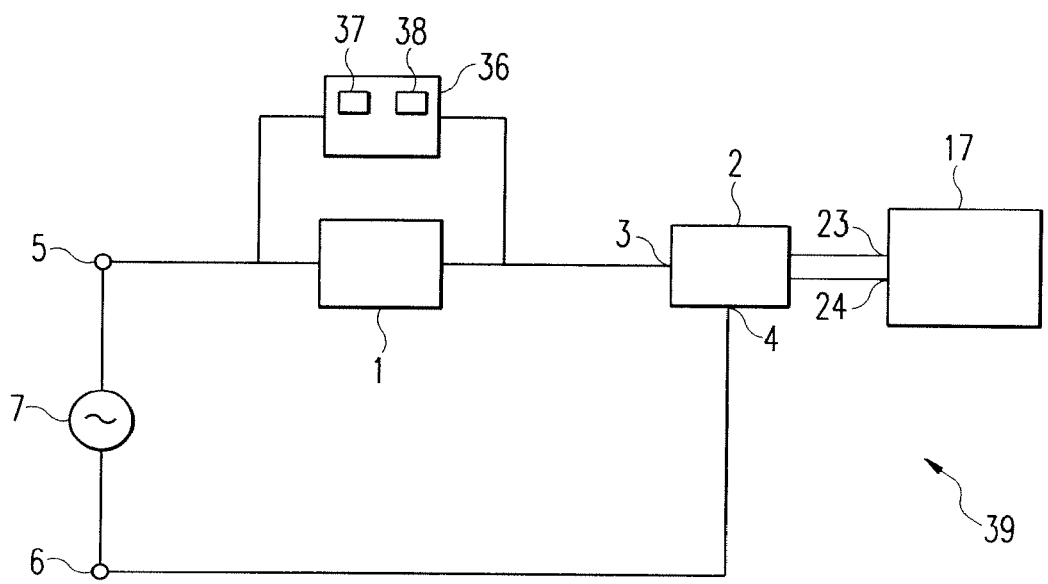
FIG. 6 shows a schematic view of an alternative lighting system according to the invention.

FIG. 6 shows in this context a schematic view of an alternative lighting system 39 according to the invention, in which the conventional switch or dimmer 1 e.g. for an incandescent lamp 8 is not replaced, but rather supplemented by a PLC transmitting unit (PLC modulator) 36. The functioning is similar to the PLC transmitting unit 32 shown in FIG. 5.

Therefore, in accordance with this aspect, a single manual dimming predefinition, or dimming predefinition predefined as a signal, is converted by the "combined dimmer" into at least two different protocols which have in common as physical carrier the voltage supply for the connected luminous means. Operating devices for luminous means connected to this combined dimmer can be designed to evaluate both or just one protocol. In this case, protocol should be understood to mean analog or digital signal transfer. In the case of the phase gating protocol or the amplitude modulation protocol, this signal transfer can settle directly, i.e. without signal-technological evaluation, on the luminous means power.

As shown in FIG. 6, the PLC transmitting unit 36 is preferably connected in parallel with the switch, push button or dimmer 1, that can alternatively also be arranged in series therewith. Switching on in parallel is advantageous insofar as the transmission of commands is also possible with an open switch or dimmer 1. The LED lamp 7 and, if appropriate, further operating devices provided with a PLC modulator for luminous means can thus be dimmed proceeding from a conventional dimmer (e.g. a phase gating dimmer) by means of the PLC protocol. If appropriate, further operating devices, such as e.g. incandescent lamps, can be dimmed by a different protocol, in particular phase cut.

Consequently, both conventional lamps (incandescent lamps) and LED or other retrofit lamps (e.g. gas discharge energy saving lamps or halogen lamps with drive electronics) can be controlled via a dimmer unit. Thus, by way of example, the dimmer signal (as phase gating) can control the incandescent lamps, and the modulator unit via the modulated signal can control the retrofit lamps with drive electronics.

The PLC unit is a modulator unit i.e. a higher-frequency signal (preferably with a low amplitude than the power supply system voltage itself) is modulated onto the power supply system voltage at least for partial ranges of the power supply system voltage half-cycle. A phase modulation (e.g. phase shift keying) can also be applied (one particular form of phase shift keying has already been mentioned).

The retrofit lamp can have, in addition to the drive circuit for feeding the lamp, a basic load that can be turned off for a correct function in connection with the dimmer, particularly if the latter has a phase gating function as described.

The modulation can also be effected by the dimmer itself, for example in the case of an electronic dimmer containing a controllable switch. The latter can both bring about phase gating or chopping and at the same time also generate the modulated signal. However, a combination of dimmer and modulator as two system present in parallel in a dimmer housing (can also be connected in series) can presumably be realized more easily.

The PLC transmitting unit 36 can transmit commands independently of the switch or dimmer 1, or can be designed to detect the actuation or the changeover of the switch or dimmer 1 and to transmit commands accordingly.

In the exemplary embodiments described above, the PLC unit 16 of the retrofit LED lamp 17 is designed for receiving commands proceeding from a PLC transmitter and for forwarding them to the control unit 15. In addition thereto, or else as an alternative thereto, said PLC unit 16 itself can transmit data via the power supply network. In order to ensure this function, it comprises a modulator (not shown) and preferably also a multiplexer (not shown). Consequently, a retrofit LED lamp 17 can transmit data such as operating parameters of the LED or the like, wherein said data can be collected for example by a central controller (not shown) via a PLC receiver for the purpose of monitoring the lighting system.

If the LED lamps 17 of a system have the transmitting and the receiving function, they can forward among one another data such as commands or operating parameters.

In the exemplary embodiments described above, the PLC unit 16 of the retrofit LED lamp 17 is designed for receiving commands proceeding from a PLC transmitter in the region of a switch or dimmer 1, 1'. Alternative embodiments are also conceivable where a central controller (not shown) outputs commands and transmits them via the power supply network. The individual LED lamp 17 connected to said power supply network are accordingly able to receive these central commands and use them for the control or regulation of the LEDs 29.

The commands which are transmitted and distributed by means of the powerline method can also include addressing information. A specific group of LED lamp 17 can thus be driven.

If a PLC unit 16 cannot demodulate the received signal and cannot reestablish the useful signal, owing e.g. to interference on the power supply network, it is advantageous for said PLC unit 16 to transmit a corresponding message in order to request further transmission of the command.

As an alternative or in addition thereto, provision is also made for a PLC transmitting unit 32, 36, which is integrated in a switch or dimmer 1', or which is connected in parallel or in series with a switch or dimmer 1, to have a PLC receiving unit (not shown). In this way, it can receive possible feedback messages of a retrofit LED lamp 17. In the above-described case where, e.g. owing to interference, the retrofit LED lamp 17 requests the renewed transmission of the command, the PLC transmitting unit 32, 36 can thus also receive this message from the LED lamp 17 and communicate the command once again via powerline methods.

The invention is advantageous since it is thereby possible to replace or supplement a conventional switch or dimmer 1 for controlling an incandescent lamp 8 in order to control a retrofit LED lamp 17 according to the invention which is used in a conventional or standardized holder for an incandescent lamp.

The invention replaces or supplements the traditional phase gating control of an incandescent lamp 8 by a powerline communication between switch and retrofit LED lamp 17.

Although a conventional switch or dimmer with phase gating control cannot control an LED, the invention makes it possible, by integrating PLC modules to be able to dim an LED lamp 17 in conventional or standardized holder for incandescent lamps or halogen holders.

LIST OF REFERENCE SIGNS

1 Switch or dimmer
2 Holder for incandescent lamp
3 Contact of the holder for the incandescent lamp
4 Contact of the holder for the incandescent lamp
5 First contact of the AC voltage
6 Second contact of the AC voltage
7 AC voltage
8 Incandescent lamp
9 Retrofit LED lamp
12 Driver circuit
13 AC-DC converter
14 DC controller, DC-DC converter
15 Control unit
16 Carrier frequency system or powerline communication (PLC) unit
17 Retrofit LED lamp
18 Carrier
19 Base
20 Demodulator
21 Demultiplexer
23 First electrical contact or base contact of the base
24 Second electrical contact or external contact of the base
25 Switching regulator
29 Light emitting diode (LED)
30 Measuring resistor
32 PLC transmitting unit (PLC modulator)
33 Modulator
34 Multiplexer
35 Lighting system
36 PLC transmitting unit
37 Modulator
38 Multiplexer
39 Lighting system

The invention claimed is:

1. A retrofit LED lamp (17), comprising a carrier (18) having at least one light emitting diode (LED) (29), a driver circuit (12) for supplying power to the LED (29) and a base (20) for electrical and mechanical connection to a conventional lampholder, wherein the retrofit LED lamp (17) comprises a power line communication (PLC) unit (16) designed for receiving and/or transmitting data via the base (20), said data being modulated by a dimmer onto the supply voltage of the LED lamp (17) by means of power line communication (PLC), wherein the power line communication (PLC) unit (16) is configured with a de-multiplexer (21), and the de-multiplexer (21) is configured to de-multiplex and extract plural signals in the de-modulated data after de-modulation of the data modulated by the dimmer.

2. The retrofit LED lamp (17) as claimed in claim 1, wherein the power line communication (PLC) unit (16) is designed for receiving commands with regard to the brightness, color and/or color temperature of the at least one LED (29), wherein, in the case of a plurality of LEDs and/or LEDs having at least two different spectra, the brightness, color and/or color temperature of individual LEDs of the plurality of LEDs or of the resultant mixed spectrum are predefined by means of the commands.

3. The retrofit LED lamp (17) as claimed in claim 1, comprising an AC-DC converter (13) for connection to a power supply system current, and a DC controller (14) connected to the AC-DC converter (13) and serving for delivering a current for operating the LED (29).

4. The retrofit LED lamp (17) as claimed in claim 3, wherein the control unit (15) controls the DC controller (14) in accordance with the received command.

5. A lighting system, comprising at least one luminous means, including at least one LED lamp as claimed in claim 1 and an actuable dimmer switch configured for a power line communication (PLC) modulation and a phase gating of the supply voltage of the LED lamp, wherein the actuation of the dimmer switch is a result of manually or signal-technological input dimming commands.

6. A method for operating at least one retrofit LED lamp (17), comprising a carrier (18) having at least one light emitting diode (LED) (29), a driver circuit (12) for supplying power to the LED (29) and a base (20) for electrical and mechanical connection to a conventional lamp holder, wherein the method comprises the steps of:
  power line communication (PLC) modulation of the supply voltage of the LED lamp by a dimmer, and
  demodulation and de-multiplexing of the carrier frequency system or powerline communication (PLC) unit (16) in the retrofit lamp (17).

* * * * *